(12) United States Patent
Shetty et al.

(10) Patent No.: US 11,809,308 B2
(45) Date of Patent: Nov. 7, 2023

(54) SYSTEM AND FRAMEWORK FOR TESTING OF APPLICATION PERFORMANCE WITH REAL-TIME SCALED SIMULATION

(71) Applicant: CERNER INNOVATION, INC., Kansas City, KS (US)

(72) Inventors: Rohith Shetty, Bangalore (IN); Shalini Bhoopathy, Bangalore (IN); Arun Kharidehal, Bangalore (IN); DivyaShree M, Bangalore (IN)

(73) Assignee: Cerner Innovation, Inc., Kansas City, MO (US)

( * ) Notice: Subject to any disclaimer, the term of this patent is extended or adjusted under 35 U.S.C. 154(b) by 81 days.

(21) Appl. No.: 17/530,617

(22) Filed: Nov. 19, 2021

(65) Prior Publication Data

US 2023/0161690 A1 May 25, 2023

(51) Int. Cl.
*G06F 11/36* (2006.01)
*G06F 11/34* (2006.01)
*G06F 11/32* (2006.01)

(52) U.S. Cl.
CPC ........ *G06F 11/3688* (2013.01); *G06F 11/327* (2013.01); *G06F 11/3414* (2013.01); *G06F 11/3457* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 6,701,514 B1 | 3/2004 | Haswell et al. | |
| 6,907,546 B1 | 6/2005 | Haswell et al. | |
| 6,941,546 B2* | 9/2005 | Apuzzo | G06F 11/3696 |
| | | | 714/E11.208 |
| 7,437,614 B2 | 10/2008 | Haswell et al. | |
| 8,266,592 B2 | 9/2012 | Beto et al. | |
| 2004/0111727 A1* | 6/2004 | Schwarzbauer | H04L 43/08 |
| | | | 719/310 |
| 2005/0131707 A1* | 6/2005 | Da Palma | H04M 3/242 |
| | | | 704/275 |
| 2012/0198351 A1* | 8/2012 | Lee | G06F 11/3688 |
| | | | 715/744 |
| 2014/0026122 A1* | 1/2014 | Markande | G06F 11/3688 |
| | | | 717/124 |
| 2015/0339218 A1* | 11/2015 | Ekambaram | G06F 11/36 |
| | | | 714/38.1 |
| 2018/0349254 A1* | 12/2018 | Hui | G06F 11/3664 |
| 2021/0182183 A1* | 6/2021 | Wan | G06F 11/3688 |
| 2021/0357939 A1* | 11/2021 | Davis | G06Q 20/4016 |

FOREIGN PATENT DOCUMENTS

EP 1269321 B1 6/2008

* cited by examiner

*Primary Examiner* — Isaac Tuku Tecklu
(74) *Attorney, Agent, or Firm* — Invoke

(57) ABSTRACT

Methods, systems, and computer-readable media are disclosed herein for a system and framework that tests end-user applications for failures, data validation, and performance indicators. In aspects, multiple use-modeling programs that mimic user interactions are used to concurrently run unique instances of the application in real-time to simulate a real-world scenario, at scale and with a full load. Whether data, operations, and/or functions of the end-user application fail or are successful is automatically documented in real-time, while performance is concurrently measured.

20 Claims, 19 Drawing Sheets

| | BILL_ITEM_ID | Order Description | CDM Number | CPA CDM Sched Description | CPT-4 | HCPCS | Revenue Code | CPT-4 Mo | Price | Patient name | Powerchart Result | Powerchart Result comment | Charge viewer Result | Charge viewer result comment |
|---|---|---|---|---|---|---|---|---|---|---|---|---|---|---|
| 2 | 8145988 | OB Visit - Initial | 10006129 | PF POSTOP FU VISIT RELATED-THE O | 74018 | C8913 | 0320 | PO | 154 | Last,First | Pass | Order placed successfully | Pass | Prices in Domain and DCW matched | Bill codes in Domain and DCW matched |
| 3 | 8145989 | OB Visit - Subsequent | 10006135 | PF POSTOP FU VISIT RELATED-THE O | 74022 | C8934 | 0320 | PO | 374 | Last,First | Fail | Order not found in domain | Pass | Prices in Domain and DCW matched | Bill codes in Domain and DCW matched |
| 4 | 7279607 | Global Post-Op Visit Statistical No Charg | 10006360 | PF POSTOP FU VISIT RELATED-THE O | 76010 | C8935 | 0320 | PO | 168 | Last,First | Pass | Order placed successfully | Fail | Reason for failure : CPT4 Modifier doesn't match DCW : 50 | Bill Item doesn't match DCW : 7749 |
| 5 | 7305765 | Vag Deliv Only in CDM Off 59409 | 10006131 | PF VAG DELIVERY ONLY | 74019 | C8935 | 0320 | PO | 262 | Last,First | Pass | Order placed successfully | Pass | Prices in Domain and DCW matched | Bill codes in Domain and DCW matched |
| 6 | 7279536 | ANTEPART CARE ONLY 4-6VST 59425 | 10006005 | PF ANTEPARTUM CARE ONLY 4-6 VIS | 73050 | C8935 | 0320 | PO | 256.5 | Last,First | Pass | Order placed successfully | Fail | Reason for failure : CPT4 Modifier doesn't match DCW : 50 | Bill Item doesn't match DCW : 7749 |
| 7 | 7279537 | ANTEPART CARE 7+VSTS 59426 | 10006195 | PF ANTEPARTUM CARE ONLY 7/> VIS | 74270 | C8920 | 0320 | PO | 888 | Last,First | Pass | Order placed successfully | Pass | Prices in Domain and DCW matched | Bill codes in Domain and DCW matched |
| 8 | 7279787 | Office Visit No Charge | 10006197 | PF ANTEPARTUM CARE ONLY 7/> VIS | 74280 | C8918 | 0320 | PO | 964 | Last,First | Pass | Order placed successfully | Fail | Charges not dropped |
| 9 | 7279744 | Office Visit Level 3 Est 99213 | 10006534 | PF OUTPT CLINIC VISIT EST LEVEL 3 | 77072 | C8919 | 0320 | PO | 186.5 | Last,First | Pass | Order placed successfully | Fail | Charges not dropped |
| 10 | 7279729 | Office Visit Level 1 Est 99211 | 10005845 | PF OUTPT CLINIC VISIT EST LEVEL 1 | 71048 | C8913 | 0324 | PO | 392 | Last,First | Pass | Order placed successfully | Fail | Charges not dropped |
| 11 | 8057997 | Tech Only Office Visit Level 1 Est 99211 | 10005843 | PF OUTPT CLINIC VISIT EST LEVEL 2 | 71047 | C8934 | 0324 | PO | 203 | Last,First | Pass | Order placed successfully | Fail | Charges not dropped |
| 12 | 7279650 | Interactive Complexity (Add-on) 90785 | 10005839 | PF INTERACTIVE COMPLEXITY | 71045 | C8934 | 0324 | PO | 203 | Last,First | Pass | Order placed successfully | Pass | Prices in Domain and DCW matched | Bill codes in Domain and DCW matched |
| 13 | 7279813 | Psych Diagnostic Eval W/O Med Mgmt 9 | 10005841 | PF PSYCHIATRIC DX EVAL | 71046 | C8935 | 0324 | PO | 279 | Last,First | Fail | Order not found in domain | Fail | Order not found in domain |
| 14 | 7279814 | Psych Diagnostic Eval W/O Med Mgmt 9 | 10005839 | PF PSYCHIATRIC DX EVAL W/MEDICA | 71045 | C8934 | 0324 | PO | 203 | Last,First | Fail | Order not found in domain | Fail | Order not found in domain |
| 15 | 7279822 | Psychotherapy, 30 Minutes 90832 | 10005885 | PF PSYCHOTHERAPY W/PAT 30 MIN | 72052 | C8920 | 0320 | PO | 489 | Last,First | Pass | Order placed successfully | Fail | Charges not dropped |
| 16 | 7279821 | Psychotherapy, 30 Mins (E&M Add-on) 9 | 10005881 | PF PSYCHOTHERAPY W/PAT 30 MIN | 72040 | C8918 | 0320 | PO | 297.75 | Last,First | Fail | Order not found in domain | Fail | Order not found in domain |
| 17 | 7279823 | Psychotherapy, 45 Minutes 90834 | 10005883 | PF PSYCHOTHERAPY W/PAT 45 MIN | 72050 | C8919 | 0320 | PO | 402.75 | Last,First | Pass | Order placed successfully | Pass | Prices in Domain and DCW matched | Bill codes in Domain and DCW matched |
| 18 | 7279819 | Psychotherapy Pt w/E+M Srvcs 45 min 9 | 10006137 | PF PSYCHOTHERAPY PT w/E+M Srvcs 45 MIN W/PAT | 74150 | C8913 | 0352 | PO | 1689 | Last,First | Pass | Order placed successfully | Pass | Prices in Domain and DCW matched | Bill codes in Domain and DCW matched |
| 19 | 7279824 | Psychotherapy, 60 Minutes 90837 | 10006141 | PF PSYCHOTHERAPY W/PAT 60 MIN | 74170 | C8934 | 0352 | PO | 2341 | Last,First | Pass | Order placed successfully | Pass | Prices in Domain and DCW matched | Bill codes in Domain and DCW matched |
| 20 | 7279820 | Psychotherapy Pt w/E+M Srvcs 60 min 9 | 10006139 | PF PSYCHOTHERAPY PT w/E+M Srvcs 60 MIN W/PAT | 74160 | C8934 | 0352 | PO | 1996 | Last,First | Pass | Order placed successfully | Fail | Charges not dropped |
| 21 | 7279603 | Family Psychotherapy w/o Patient 9084 | 10006356 | PF FAMILY PSYCHOTHERAPY W/O PA | 75989 | C8935 | 0320 | PO | 646 | Last,First | Pass | Order placed successfully | Fail | Charges not dropped |
| 22 | 7279606 | Family Psychotherapy with Patient 9084 | 10006506 | PF FAMILY PSYCHOTHERAPY W/PAT | 77012 | C8935 | 0350 | PO | 1756 | Last,First | Pass | Order placed successfully | Pass | Prices in Domain and DCW matched | Bill codes in Domain and DCW matched |
| 23 | 7279666 | MULTIPLE FAMILY GROUP PSYCHOT | 10005787 | PF MULT-FAMILY GRP PSYCHOTHER | 70450 | C8920 | 0351 | PO | 1223 | Last,First | Pass | Order placed successfully | Pass | Prices in Domain and DCW matched | Bill codes in Domain and DCW matched |
| 24 | 7279608 | Group Therapy 90853 | 10005791 | PF GRP PSYCHOTHERAPY IOP | 70470 | C8918 | 0351 | PO | 1547 | Last,First | Pass | Order placed successfully | Pass | Prices in Domain and DCW matched | Bill codes in Domain and DCW matched |
| 25 | 7279863 | SPEECH/HEARING THERAPY 92507 | 10005789 | PF GRP PSYCHOTHERAPY IOP | 70460 | C8919 | 0351 | PO | 1432 | Last,First | Pass | Order placed successfully | Pass | Prices in Domain and DCW matched | Bill codes in Domain and DCW matched |
| 26 | 7279879 | SWALLOWING TREATMENT ST/ENT 92 | 10006506 | PF GRP PSYCHOTHERAPY IOP | 77012 | C8913 | 0350 | PO | 1756 | Last,First | Pass | Order placed successfully | Fail | Reason for failure : CPT4 Modifier doesn't match DCW : 50 | Bill Item doesn't match DCW : 7749 |
| 27 | 7279528 | ACOUSTIC REFLEX TESTING 92568 | 10005859 | PF GRP PSYCHOTHERAPY IOP | 71250 | C8934 | 0352 | PO | 1482 | Last,First | Pass | Order placed successfully | Fail | Reason for failure : Price doesn't match DCW : 1450 | Bill Item doesn't match DCW : 7749368 |
| 28 | 7295723 | Autism Screening Limited (MCHAT) 961 | 10005863 | PF SCREENING DEVELOPMENTAL P | 71270 | C8934 | 0352 | PO | 2058 | Last,First | Pass | Order placed successfully | Fail | Reason for failure : Price doesn't match DCW : 2508 | Bill Item doesn't match DCW : 7749376 |
| 29 | 7279828 | PT FOCUSED HEALTH RISK ASSMT 96 | 10005861 | PF SCREENING DEVELOPMENTAL P | 71260 | C8935 | 0352 | PO | 1683 | Last,First | Pass | Order placed successfully | Fail | Reason for failure : Price doesn't match DCW : 1980 | Bill Item doesn't match DCW : 7749334 |
| 30 | 7279609 | Handle/convey/specimen/office-lab 950 | 10005799 | PF SCREENING DEVELOPMENTAL P | 70486 | C8935 | 0351 | PO | 1183 | Last,First | Fail | Order not found in domain | Fail | Order not found in domain |

FIG. 17

SYSTEM AND FRAMEWORK FOR TESTING OF APPLICATION PERFORMANCE WITH REAL-TIME SCALED SIMULATION

TECHNICAL FIELD

The present disclosure generally relates to a framework for testing software applications.

BACKGROUND

Existing technologies are unable to perform testing of an application in a manner that simulates a real-time, real-world use scenario, which can include hundreds of end-users that concurrently access and utilize distinct instances of applications in a distributed network, each instance corresponding to a unique step within a workflow in the application(s). For example, thirty different end-users may run separate instances of the same application, and each end-user may interact with the application at different points in a workflow. Existing technologies are unable to simulate such a real-time, real-world use scenario to test applications at scale and with a full load.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is predetermined by the claims as supported by the Specification, including the Detailed Description.

In brief and at a high level, this disclosure describes, among other things, methods, systems, and computer-readable media for a framework that accurately tests the performance of multiple applications. At a high level, the aspects herein autonomously run executable scripts that test operations and performance of end-user applications in order to detect failures and measure performance indicators. Specifically, the methods, systems, and computer-readable media simulate hundreds of concurrent and distinct end-user application instances being utilized in real-time, each end-user application instance corresponding to different utilization points within that end-user application, while using and validating up to millions of rows of reference data to detect failures in the end-user application at scale and with full loading. As such, failures can be detected and key performance indicators can be measured.

A system is provided in aspects. The system comprises an execution engine, a repository, and a testing application. The system is configured to import, via the testing application, a use-modeling program that is a script for autonomously performing a plurality of steps. The system also imports, via the testing application, a data collection workbook. Via the execution engine, the system executes a use-modeling program that references the data collection workbook to simulate a plurality of concurrent instances of an end-user application run in real-time, wherein the plurality of concurrent instances are independently initiated are various steps in the plurality of steps. The testing application detects when one or more of a step failure, a data validation failure, a loading failure, or an operation failure of the end-user application occurs for one or more of the plurality of concurrent instances based on executing the use-modeling program. The testing application further stores data documenting the one or more of the step failure, the data validation failure, the loading failure, or the operation failure in the repository.

A computerized method is provided in another aspect. The computerized method comprises importing a use-modeling program that is a script for autonomously performing a plurality of steps. A data collection workbook is also imported. The use-modeling program that references the data collection workbook is executed to simulate a plurality of concurrent instances of an end-user application run in real-time, wherein the plurality of concurrent instances are independently initiated are various steps in the plurality of steps. One or more of a step failure, a data validation failure, a loading failure, or an operation failure of the end-user application are detected for one or more of the plurality of concurrent instances based on executing the use-modeling program. Data documenting the one or more of the step failure, the data validation failure, the loading failure, or the operation failure is stored in a repository.

Another aspect provides one or more non-transitory computer-readable media having computer-executable instructions embodied thereon that, when executed, perform a method. The media comprises importing a plurality of use-modeling programs that are scripts for autonomously performing a plurality of steps and importing a plurality of data collection workbooks. Each of the plurality of use-modeling programs is concurrently executed in real-time. Each of the plurality of use-modeling programs references a corresponding data collection workbook to simulate a plurality of concurrent instances of an end-user application run in real-time, wherein the plurality of concurrent instances are independently initiated are various steps in the plurality of steps. Further, one or more of a step failure, a data validation failure, a loading failure, or an operation failure of the end-user application is detected for one or more of the plurality of concurrent instances based on executing the use-modeling program. Data documenting the one or more of the step failure, the data validation failure, the loading failure, or the operation failure is stored in the repository.

BRIEF DESCRIPTION OF THE DRAWINGS

Embodiments are described in detail below with reference to the attached drawings figures, wherein:

FIGS. 3-18 depict examples of graphical user interfaces in accordance with aspects of the present invention;

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects described herein overcome the limitations of existing systems and technologies in the technical field. Existing systems and technologies are unable to perform testing of an application under real-time scenarios and real-world conditions. For example, existing technologies are unable to accurately test the performance of multiple applications using a simulation of hundreds of concurrent distinct application instances being utilized by hundreds of distinct users, in real-time, using millions of rows of reference data. Aspects herein are able to accurately test the performance of multiple applications by accurately simulating hundreds of concurrent distinct application instances being utilized in real-time by hundreds of distinct users, each at different utilization points within an applications, in real-time, using millions of rows of reference data.

Figure 1:
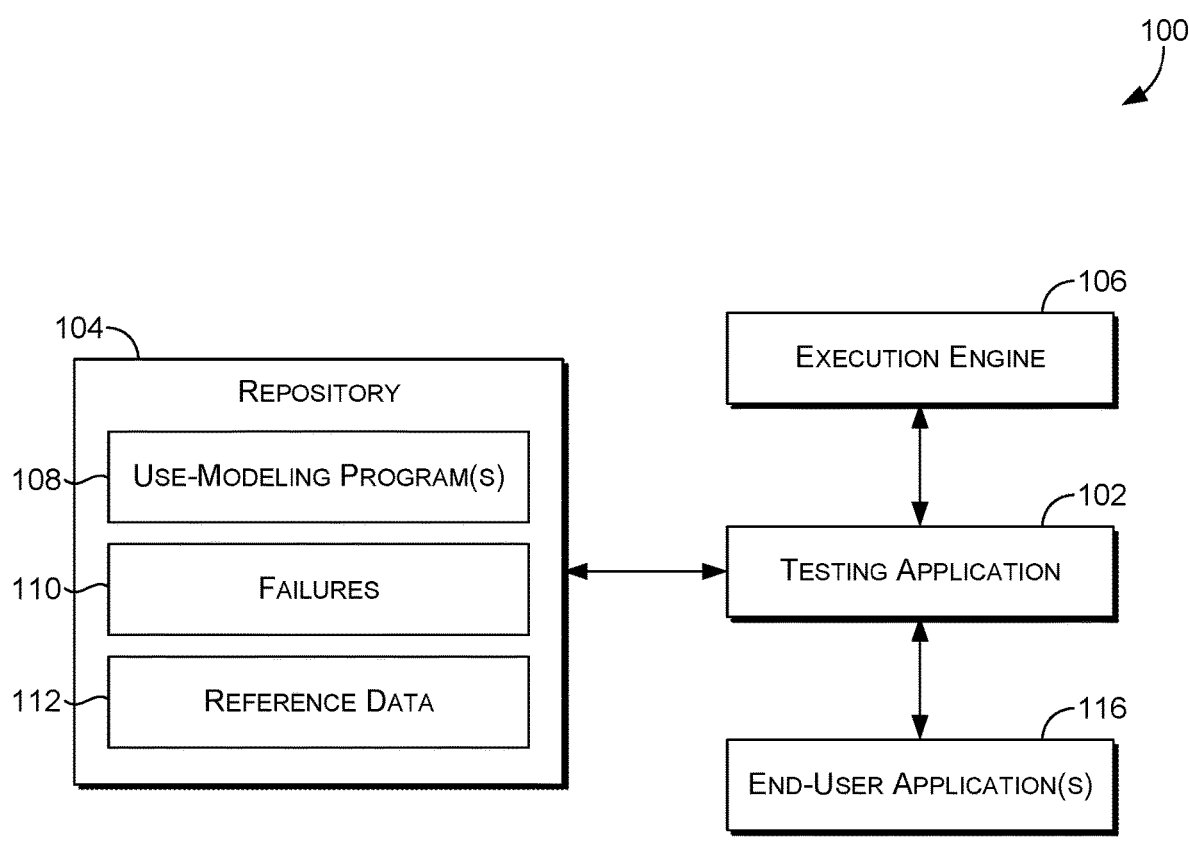
FIG. 1 is a block diagram of an example system in accordance with aspects of the present invention.

Beginning with FIG. 1, a system 100 for real-time testing of applications with failure detection and documentation is provided. The system 100 includes a testing application 102, a repository 104 having memory, and an execution engine 106, in various aspects. The components of the system 100 may be connect via a wireless network, a hardwired network, or a combination of both, in aspects.

The repository 104 can be a data store or data base having memory. The repository 104 may be a single standalone data store or data base, or alternatively, a combination of multiple data stores or data bases. The terms "data store" and "data base" are used interchangeably herein. The repository 104 may access, leverage, and/or utilize media such as physical memory, cloud-based memory, virtual memory, primary memory (e.g., cache, Random Access Memory (RAM), Read-Only Memory (ROM)), secondary memory (e.g., magnetic, optical, solid state), or any combination thereof, in a single data store or across multiple data stores, whether physically co-located or distributed across a network. As such, the repository 104 may store structured data, unstructured data, or a combination thereof. In aspects, the repository 104 may store computer-executable programming instructions for executing or "running" one or more use-modeling programs 108, one or more end-user applications, and/or one or more testing applications, such as testing application 102. Additionally or alternatively, the repository 104 may store reference data 112, such as one or more data collection workbooks obtained from one or more client domains. The repository 104 may store reference data 112 in distinct data collection workbooks, wherein each data collection workbooks corresponds to one or more end-user application(s) 116. For example, one data collection workbook in the repository 104 might correspond to one end-user application, or might correspond to multiple end-user applications (e.g., reusable reference data). In another example, one end-user application may correspond to a plurality of data collection workbooks stored in the repository. In aspects, the repository 104 can further store data that electronically documents failures 110 that occur, that are detected, and/or that are monitored via the testing application 102 as later discussed herein.

The execution engine 106 is a specially-configured module that executes computer programming code in a runtime environment using one or more processors. Generally, the execution engine 106 executes one or more use-modeling programs 108, which incorporate, reference, ingest, and/or use data obtained from one or more data collection workbooks, in aspects. As mentioned, the data collection workbooks acts at reference data that is specific to one or more end-user applications to tested using one or more use-modeling programs. In various aspects, a plurality of use-modeling programs can be autonomously and concurrently executed by the execution engine 106, at the direction of the testing application 104. Alternatively, a plurality of use-modeling programs 108 are autonomously and sequentially executed one at a time by the execution engine 106, at the direction of the testing application 104. In another aspect, a portion or subset of a plurality of use-modeling programs 108 can be concurrently executed as a batch, while another portion or subset of the plurality of use-modeling programs 108 are sequentially executed. In any scenario, the execution engine 106 executes scripts based on a trigger from and/or in response to an indication received from the testing application 102.

A use-modeling program refers to computer programming instructions or a "script" that defines an ordered plurality of steps to be performed autonomously when the script is executed using one or more processors. The script includes instructions that enable the plurality of steps to be performed autonomously by the execution engine 106 without requiring user interaction or manual input. As such, the execution engine 106 can concurrently execute the scripts for a plurality of use-modeling programs 108 in order to test performance of one or more end-user application(s) 116. By concurrently executing, in real-time, multiple use-modeling programs 108 that reference corresponding data collection workbooks, the system 100 is able to simulate a plurality of concurrent instances of the end-user application(s) 116 being run in real-time. The plurality of concurrent instances are independently initiated are various steps in the plurality of steps of the program. This simulates a real-world scenario at scale with full loading, such as hundreds of distinct users that are each running different instances of the end-user application(s) 116, where each user is undertaking different concurrent actions, inputting data, and/or performing various steps in the end-user application(s) 116. As such, the ordered plurality of steps in the use-modeling program correspond to a plurality of simulated user interactions of the end-user application(s) 116, such that the script causes the steps to be autonomously performed via the computer without requiring user interaction or manual input when testing the quality and performance of the end-user application. The execution engine 106 causes the script to autonomously perform, in real-time, the plurality of simulated user interactions in a predetermined sequence, in aspects, thus mimicking a user using the end-user application for the purpose of the testing the end-user application at scale and with full loading.

The predetermined sequence of the plurality of simulated user interactions mimics a real-world sequence of operations that would be triggered and performed by the end-user application(s) 116 in response to a real-world sequence of user interactions and/or input to a graphical user interface of the end-user application(s) 116, in aspects. As such, the ordered plurality of steps in the program can also correspond tasks, functions, and/or operations performed by the end-user application(s) 116, in addition to mimicking user inputs and/or user interactions. The execution of the script is able to simulate a plurality of simulated user interactions and operations regarding the end-user application(s) 116, which are autonomously performed in real-time via the execution engine 106. For example, the ordered plurality of steps may represent a plurality of simulated user interactions for entering a medical order via one or more fields, selections, "clicks", text inputs, or the like to simulate a query for a medical order template, the entry of user input text to the medical order template, and a submission of entry of a detailed medical order, via a graphical user interface that is specific to a particular end-user application that is being tested. The script, as written in a computer programming language, uses one or more variables and one or more values obtained from reference data 11 when testing the end-user application(s) 116. The reference data 112, such as a data collection workbook, can include a plurality of variables and a plurality of values that are specific to the end-user application(s) 116 being tested, in aspects.

The testing application 102 is a specially configured computer program that performs operations, tasks, functions, and more to build use-modeling programs and to perform testing of one or more of the end-user application(s) 116. For each of a plurality of end-user application(s) 116, the testing application 102 imports one or more (or a plurality) of use-modeling programs 108 that are scripts for autonomously performing a plurality of steps. The plurality of steps can be distinct and unique to each use-modeling program, and the steps can be further customized for testing a specific end-user application. The plurality of steps in a use-modeling program 108 represent, mimic, and/or correspond to a plurality of simulated user interactions of a particular or specific end-user application, as discussed above.

Figure 3:
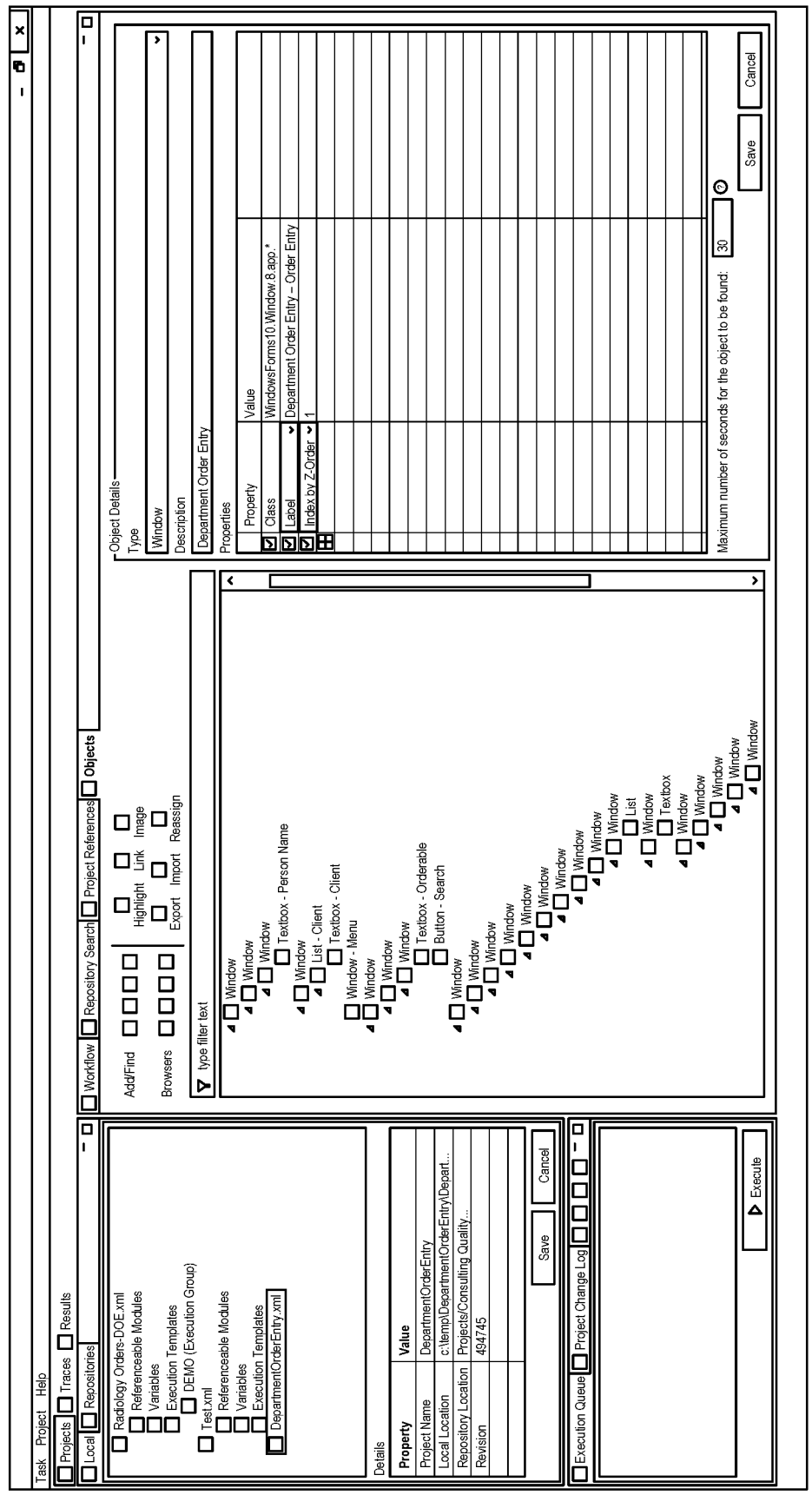
Figure 4:
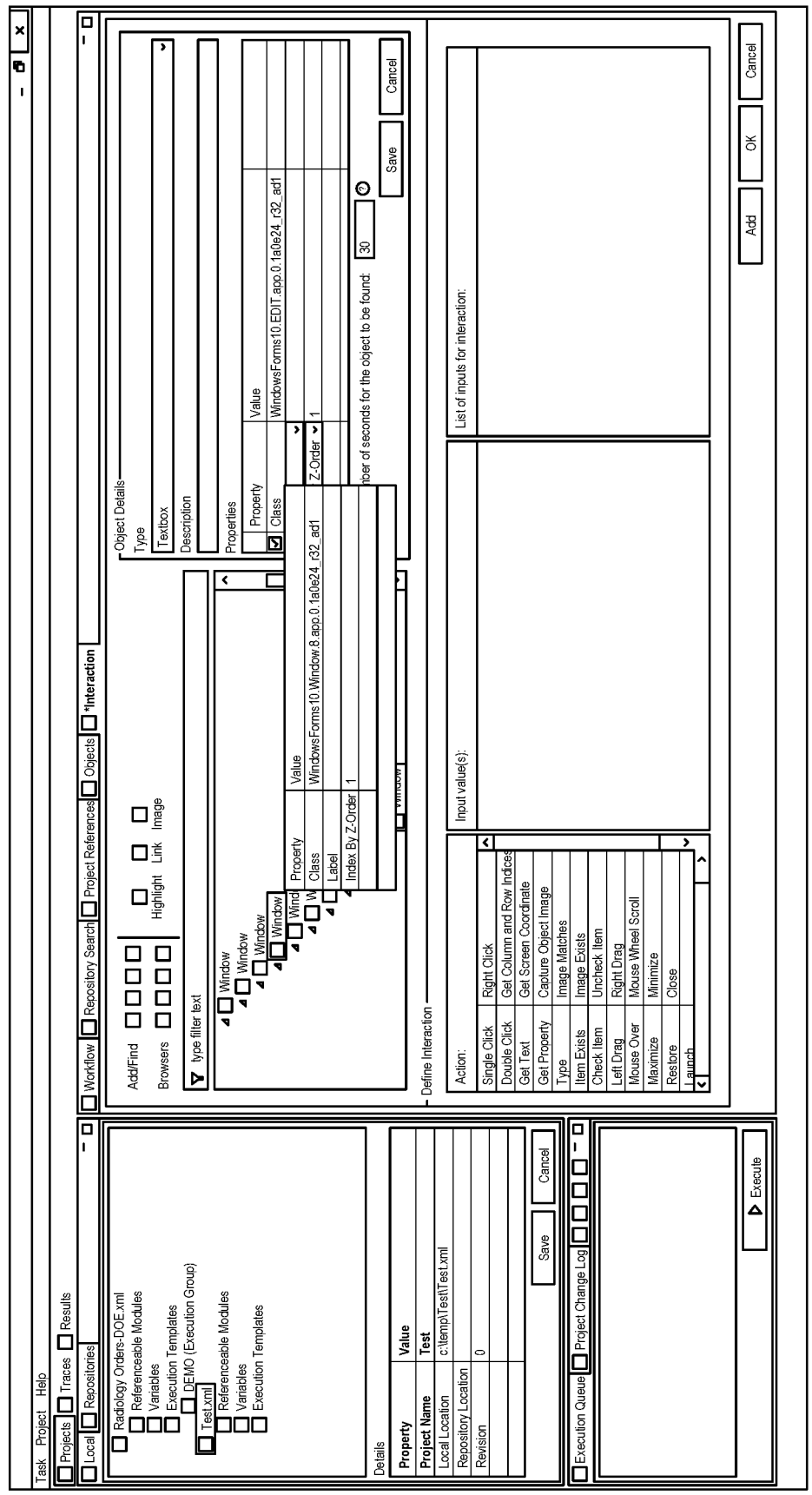
Figure 5:
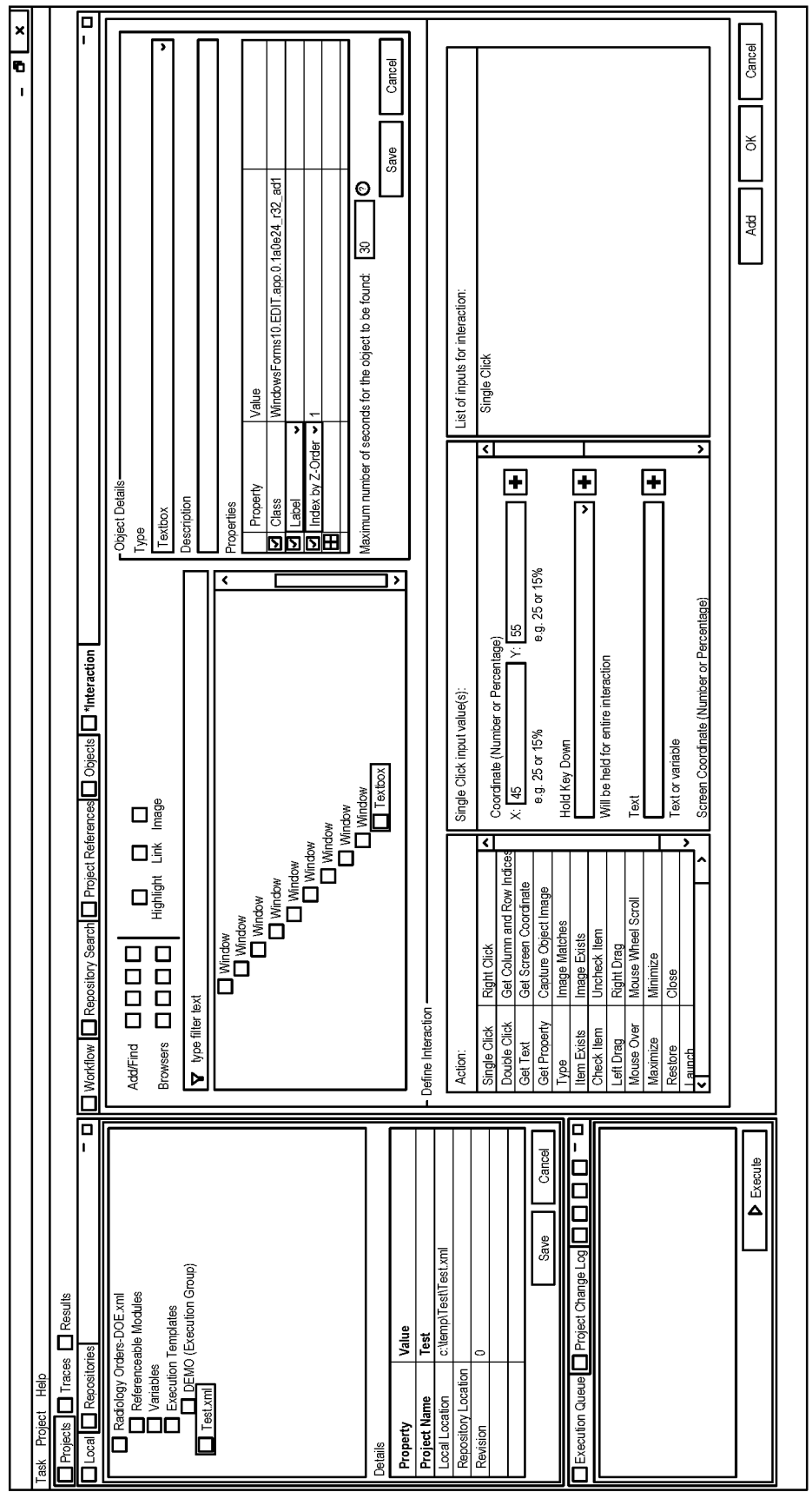
Figure 6:
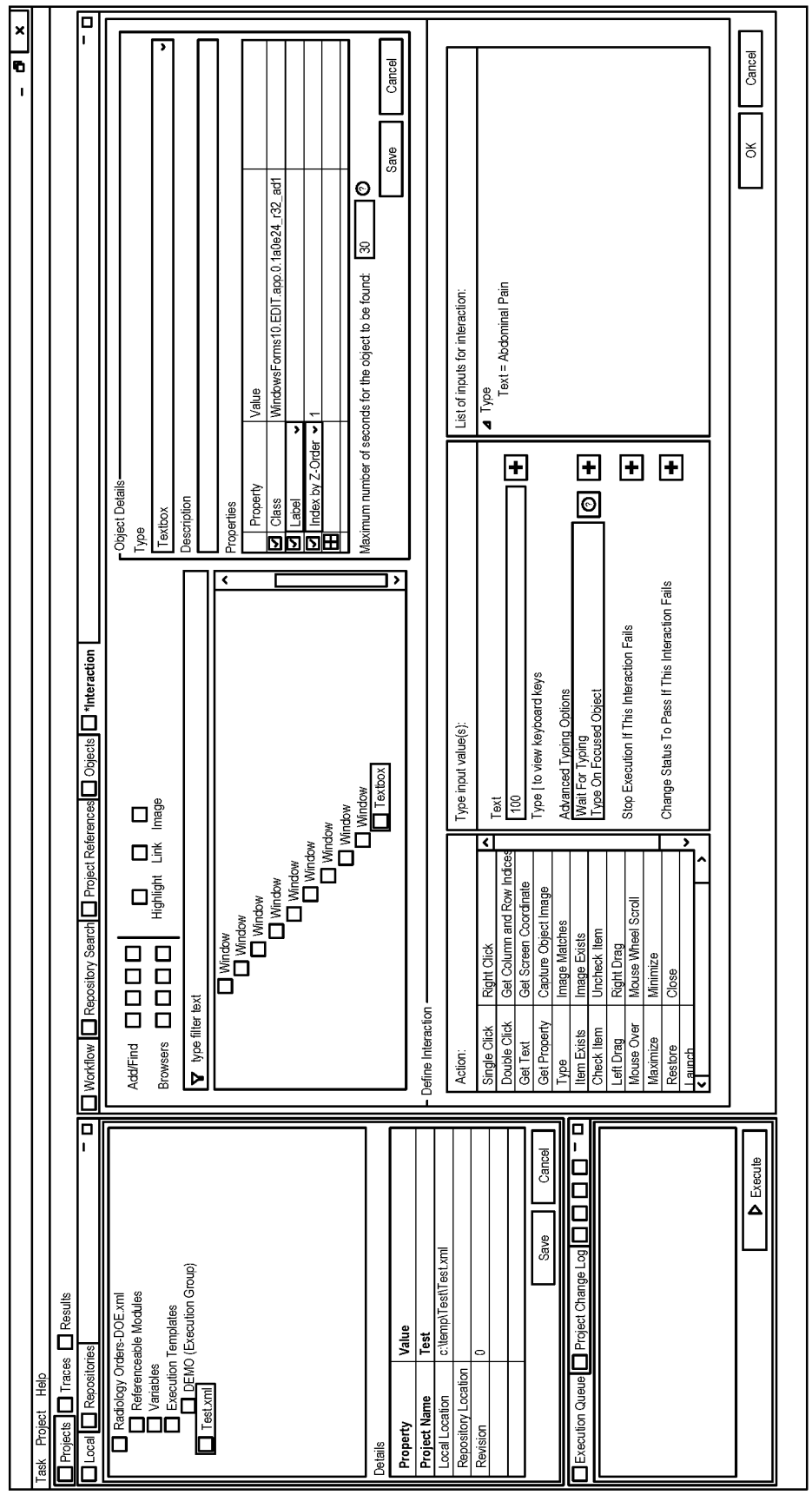
Figure 7:
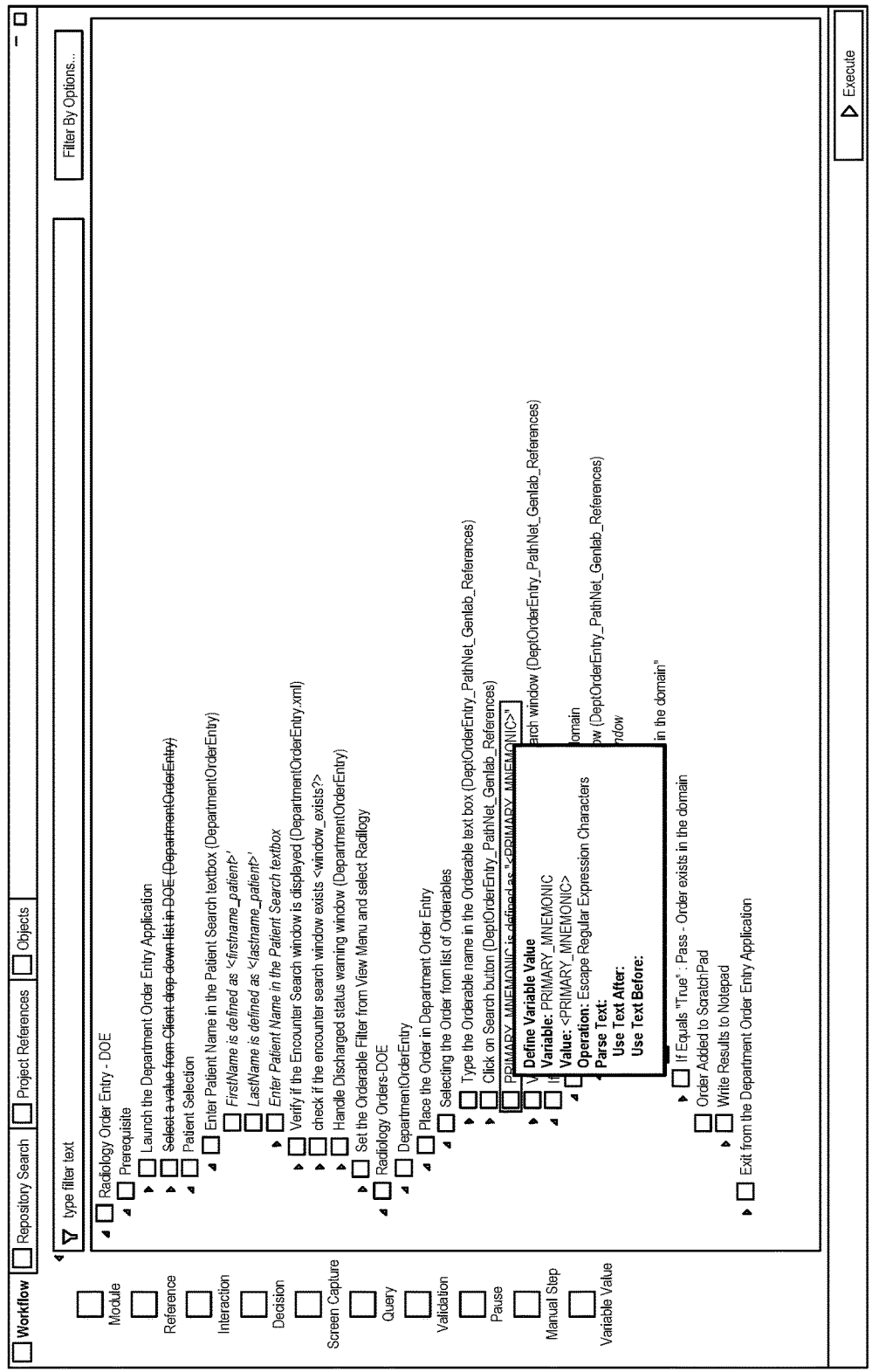

The testing application 102 can import use-modeling programs 108 that correspond to and model user interactions for various end-user applications. Additionally or alternatively, the use-modeling programs can be created and custom built using the testing application 102 based on graphical user interface "workflows" of end-user applications, in various aspects. For example, FIGS. 3-7 depict examples of graphical user interfaces of the testing application 102 that can be used to create custom use-modeling programs 108 for execution via the execution engine 106. The graphical user interface 300 of FIG. 3 depicts a hierarchy of nested objects under a selectable/active Objects tab, wherein the objects refers to graphical objects such as windows, lists, textbox, and the like, which are presentable in a graphical user interface of the end-user application for which the program/script is customized for testing. The relative placement of the objects in the hierarchy represents how, via a graphical user interface of the end-user application(s) 116, each corresponding object is accessible in the end-user application, is trigger for presentation in the end-user application, is configured for input in the end-user application, or the like. For example, object Textbox—Orderable and object Button—Search are displayed nested within the object Window to represent that object Textbox—Orderable and object Button—Search are accessed via and/or presented within the object Window within the end-user application being modeled. The graphical user interface 400 of FIG. 4 presents information under a selectable/active Interaction tab, which can be used to define user interactions (e.g., single click, right click, right drag, mouse wheel scroll, mouse over), inputs, movements (e.g., get text, get screen coordinates) associated with particular objects of the graphical user interface of the end-user application(s) 116 being modeled by the customized script that will be used to test the performance of the end-user application when executed via the execution engine 104. Similar to FIG. 4, the graphical user interface 500 of FIG. 5 includes fields for the testing application 102 that, via user input, specifically define single click coordinates on the x- and y-axis for a step modeled in the use-modeling program being built to test the end-user application. For example, an input of Single Click can be selected that will cause the script to simulate a user interaction of a single mouse click, with regard to a particular selected object Textbox in the end-user application being modeled. In FIG. 6, fields shown in the graphical user interface 600 of the testing application 102 are configured to receive user input such as text, text value, and/or advanced typing options that are also used to custom define steps for the use-modeling program 108 to perform when testing the end-user application. For example, a text input value Abdominal Pain is defined for the script to autonomously input into a particular selected object Textbox when testing the end-user application. Finally, FIG. 7 depicts a graphical user interface 700 of the testing application 102 that displays an example use-modeling program with detailed steps for objects and interactions defined for the end-user application(s) 116 to be tested. Thus, using the testing application 102, custom use-modeling programs 108 can be built and executed via the execution engine 104 to test the end-user application(s) 116. When the execution engine 106 executes the use-modeling program 108 at the direction of the testing application 102, for example, the script is able to autonomously perform, in real-time, simulated user interactions in a predetermined sequence in order to test the end-user application(s) 116.

Figure 8:

The testing application 102 also imports a plurality of data collection workbooks. FIG. 8 depicts a graphical user interface 800 of the testing application 102 that displays a highly simplified example of reference data 112, organized as a data collection workbook. Each data collection workbook, which acts as reference data 112, includes a plurality of variables and a plurality of values that are specific to one or more corresponding end-user application(s). As shown in FIG. 8, the variables may be organized under a column, wherein each variable has an identifier that corresponds to an object and/or user interaction for testing purposes. The variables may be one or more corresponding values and/or a description. For example, a variable of firstname_patient corresponds to an object in the end-user application and is assigned a value of "STAN" to be input when testing the end-user application(s) 116 via a use-modeling program 108. Each data collection workbook can include hundreds, thousands, or millions of lines of data. The variables and variables' value(s) are ingested by the execution engine 106 at the direction of the testing application 102 when executing one or more particular use-modeling programs for the purpose of testing one or more of the end-user application(s) 116, as the values can be used, as input, interactions, insertions, and/or can be ingested for fields, textboxes, windows, lists, icons, and other objects in the end-user application when the script performs steps for testing. For example, a script autonomously locates and inputs a particular variable's value, obtained from an imported data collection workbook, into a corresponding field within a graphical user interface of the end-user application(s) 116 in order to mimic user input to the field. The input to the field can then trigger operations performed by the end-user application(s) 116 as a part of the testing, to ensure performance of the end-user application(s) and its system operations are successful.

For each of the plurality of use-modeling programs 108 executed at the direction of the testing application 102, the testing application 102 can receive, monitor, detect, or determine whether the following failures 110 occur when steps are performed via the script: a step failure, a data validation failure, a loading failure, an operation failure of the end-user application(s), or any combination thereof, for one or more of the plurality of concurrent instances simulated by executing the use-modeling program(s) 108. Each and every failures that occurs for any and all steps, in each and every instance, can be detected in real-time by the testing application 102. A step failure refers to a failure of an end-user application to properly or completely perform one or more tasks, functions, and/or operations caused by and/or resulting from the attempted performance of a particular step in a program within one or more of the simulated instances. A data validation failure refers to a failure of an end-user application to properly or completely perform one or more tasks, functions, and/or operations that is caused by or results from the use of data from a line in the data collection workbook. A loading failure refers to a failure of an end-user application to properly or completely perform one or more tasks, functions, and/or operations caused by and/or resulting from the processing load of the combined, concurrently running plurality of instances. An operation failure refers to a failure of an end-user application to properly or completely perform one or more tasks, functions, and/or operations resulting from the end-user application itself. At the direction of the testing application 102, data documenting each and/or every step failure, data validation failure, loading failure, and/or operation failure for each and/or every instance tested are stored in the repository 104. The data stored may include details of the corresponding program step, task, function, and/or operation for which the failure arose, in aspects.

Although described above as a sequential process, it will be understood from this discussion that the testing application 102 concurrently tests multiple applications at one time, such that the steps of many programs are being used to test multiple concurrently-run simulated instances of multiple applications.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should be not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Figure 2:
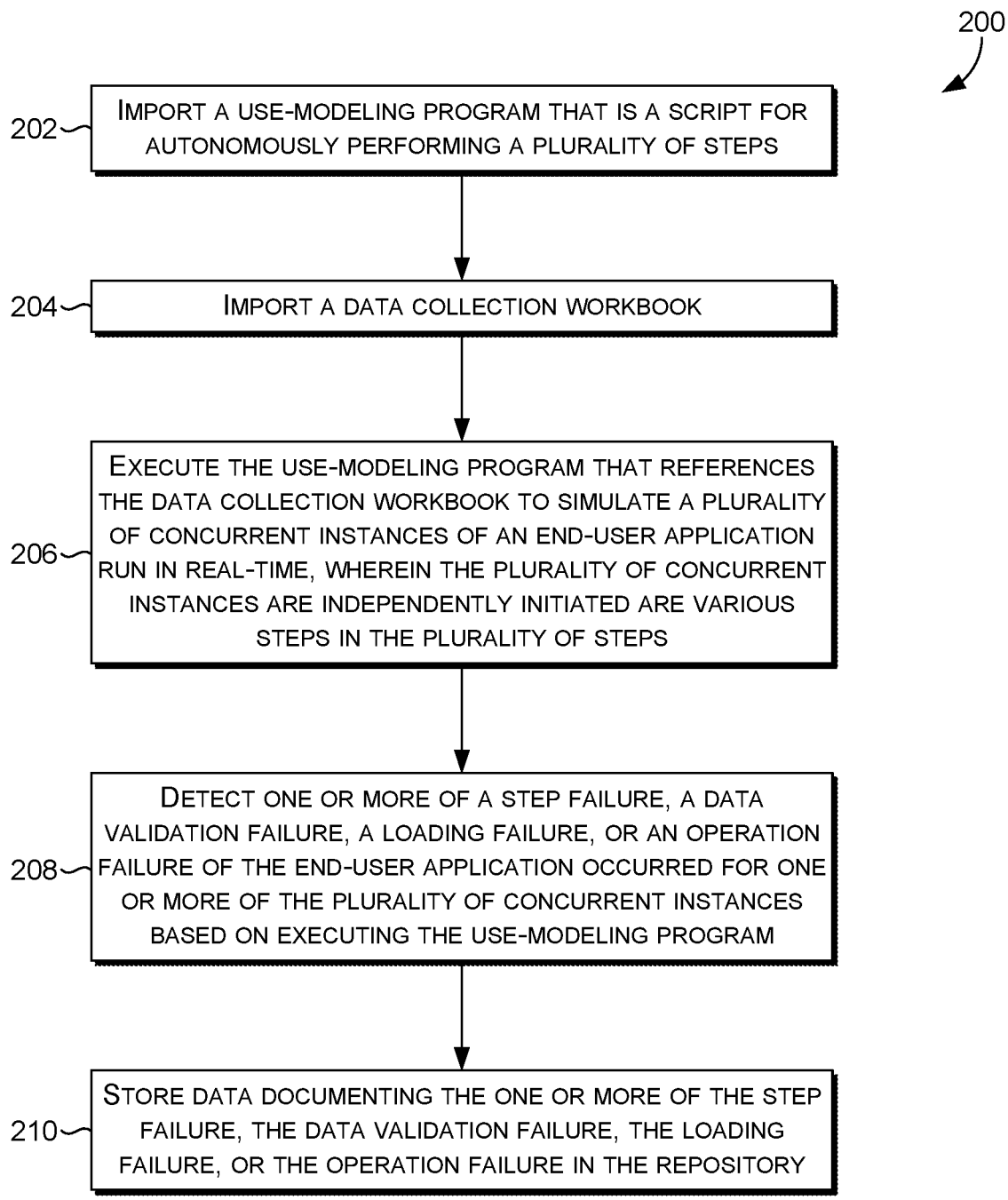
FIG. 2 is a flow diagram of an example method in accordance with aspects of the present invention.

Continuing to FIG. 2, a method 200 is provided. In some embodiments, the method 200 can be a computer-implemented method. In one embodiment, one or more non-transitory computer-readable storage media having computer-readable instructions or computer-readable program code portions embodied thereon, for execution via one or more processors, can be used to implement and/or perform the method 200. For example, computer-readable instructions or computer-readable program code portions can specify the performance of the method 200, can specify a sequence of steps of the method 200, and/or can identify particular component(s) of software and/or hardware for performing one or more of the steps of the method 200, in embodiments. The computer-readable instructions or computer-readable program code portions can correspond to an application and/or an application programming interface (API), in some embodiments. In one embodiment, the application or API can implement and/or perform the method 200. As discussed below, the method 200 can be performed using software, hardware, component(s), and/or device(s) depicted in the example of FIG. 1.

At block 202, a use-modeling program is imported, which is a script for autonomously performing a plurality of steps. The plurality of steps are a plurality of simulated user interactions for an end-user application, for example, where the steps include one or more of user input, a click, a submission, an operation, a task, a function, or any combination thereof as organized in a predetermined order that mimics a user of the end-user application. For example, the predetermined order of the steps may mimic a user entering text inputs to multiple fields of a graphical user interface in order to enter details for a medical order as well a user interactions such as selections to submit the medical order, for testing an end-user medical order application. The predetermined order of the steps is performed, in this example, for each of many medical orders input from the data collection workbook.

At block 204, a data collection workbook is imported. The data collection workbook includes lines of data to be utilized by the use-modeling program when testing end-user application(s). The data collection workbook acts as reference data, having hundreds to millions of lines of data that defines variables and values for those variables. The variables and values are used during execution of the use-modeling program as described previously.

At block 206, the use-modeling program that references the data collection workbook is executed in order to simulate a plurality of concurrent instances of an end-user application run in real-time, wherein the plurality of concurrent instances are independently initiated are various steps in the plurality of steps. For example, one instance of a medical order placement application may be initiated at a "step" of a user inputting text into fields to form a medical order whereas another instance of the same medical order placement application is initiated at a "step" of a user providing an indication to submit a medical order. Both instances, as well as others, are concurrently run when the use-modeling program is executed. Further, in this example, the text that is autonomously input to the fields by the script in one instance of the application, where the script autonomously retrieves the text for input for a corresponding variable's value in a data collection workbook. In this continued example, the step of a user providing an indication to submit a medical order is performed by the script to trigger the application being tested. Thus, when the script autonomously inputs the value predetermined for the variable into the graphical user interface of the end-user application, the script triggers one or more operations to be performed by the end-user application as part of testing the end-user application. Although two instances of an end-user application being tested by simulation are discussed, it will be understood from this discussion that hundreds of instances of the end-user application are being initiated and run concurrently for testing the end-user application, by execution of the script. As such, concurrently executing multiple use-modeling programs causes multiple corresponding scripts to run, and to autonomously perform, in real-time, each of the steps for the plurality of simulated user interactions in a predetermined sequence, for each application being tested. Each program mimics a real-world sequence of operations performed by the end-user application in response to a real-world sequence of user interactions with a graphical user interface of the end-user application. As such, the method 200 is able to simulate a real-time use scenario to concurrently test a plurality of applications for a plurality of simulated users at scale with full loading (e.g., hundreds of instances simulated for each of many applications).

Continuing to block 208, one or more of a step failure, a data validation failure, a loading failure, or an operation failure of the end-user application are detected for one or more of the plurality of concurrent instances based on executing the use-modeling program. The one or more failures may be detected, monitored, tracked, summarized, and/or recorded in real-time with execution of the script as the end-user application is tested. At block 210, data documenting the one or more of the step failure, the data validation failure, the loading failure, and/or the operation failure is stored in a repository. The detection of a failure and storage of the failure data can occur in real-time during execution. As such, other instances of an end-user application can continue to be tested when another instance experiences a failure, such that the instances are run independently of one another when testing the end-user application at scale and with full loading.

The method 200 continues to work through data in each line of the data collection workbook(s) in order to test and validate (or fail) each line of data for the end-user application within the real-time simulations of the plurality of concurrent instances of the end-user application. In this manner, the method 200 can validate millions of line of data in data collections workbooks for multiple applications, while documenting data validation failures. Further the method 200 is able to document operation failures and loading failures because the simulation is running at scale and with full loading for multiple applications, in addition to the other failure types mentioned.

Figure 9:
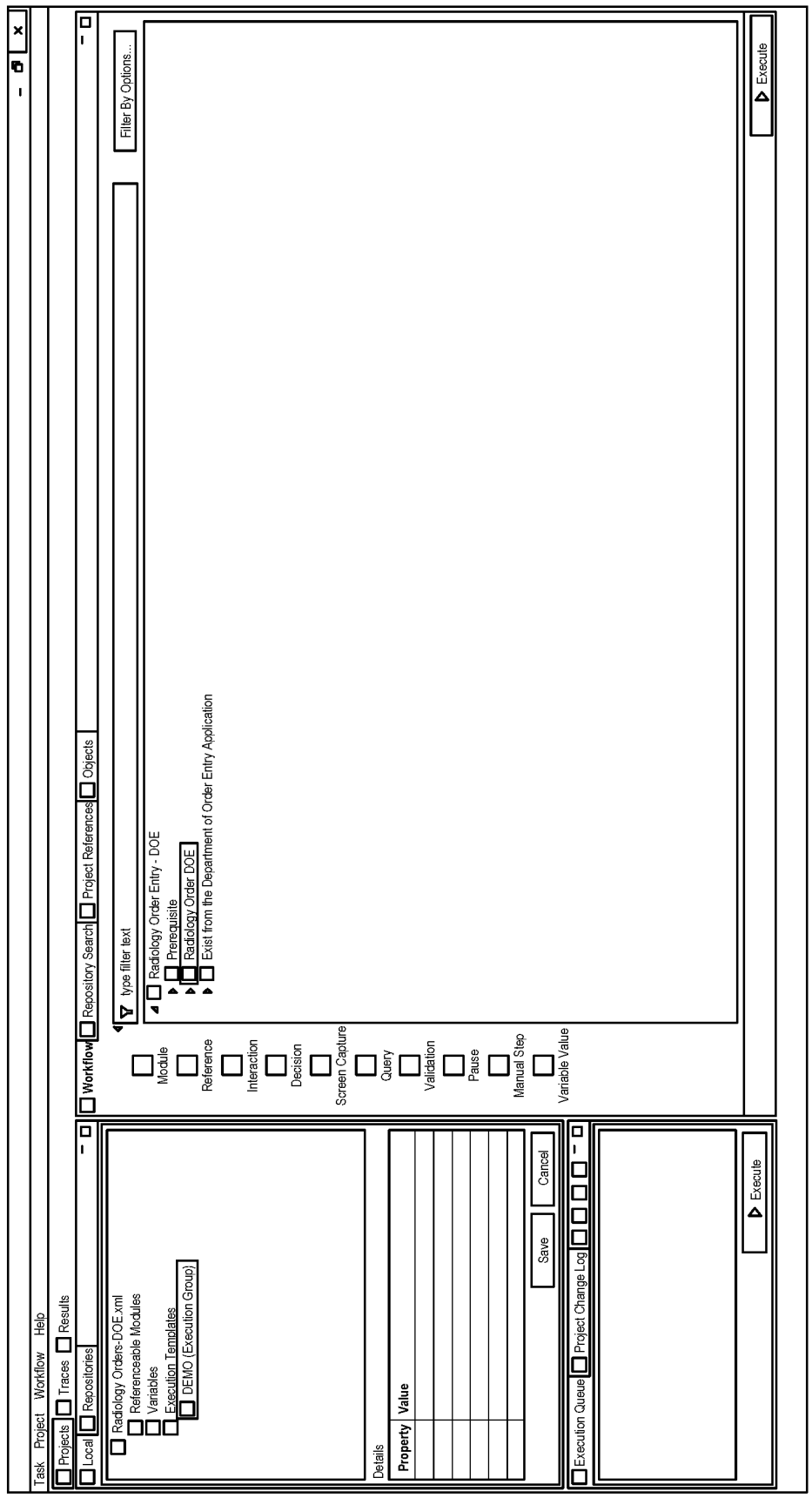
Figure 10:
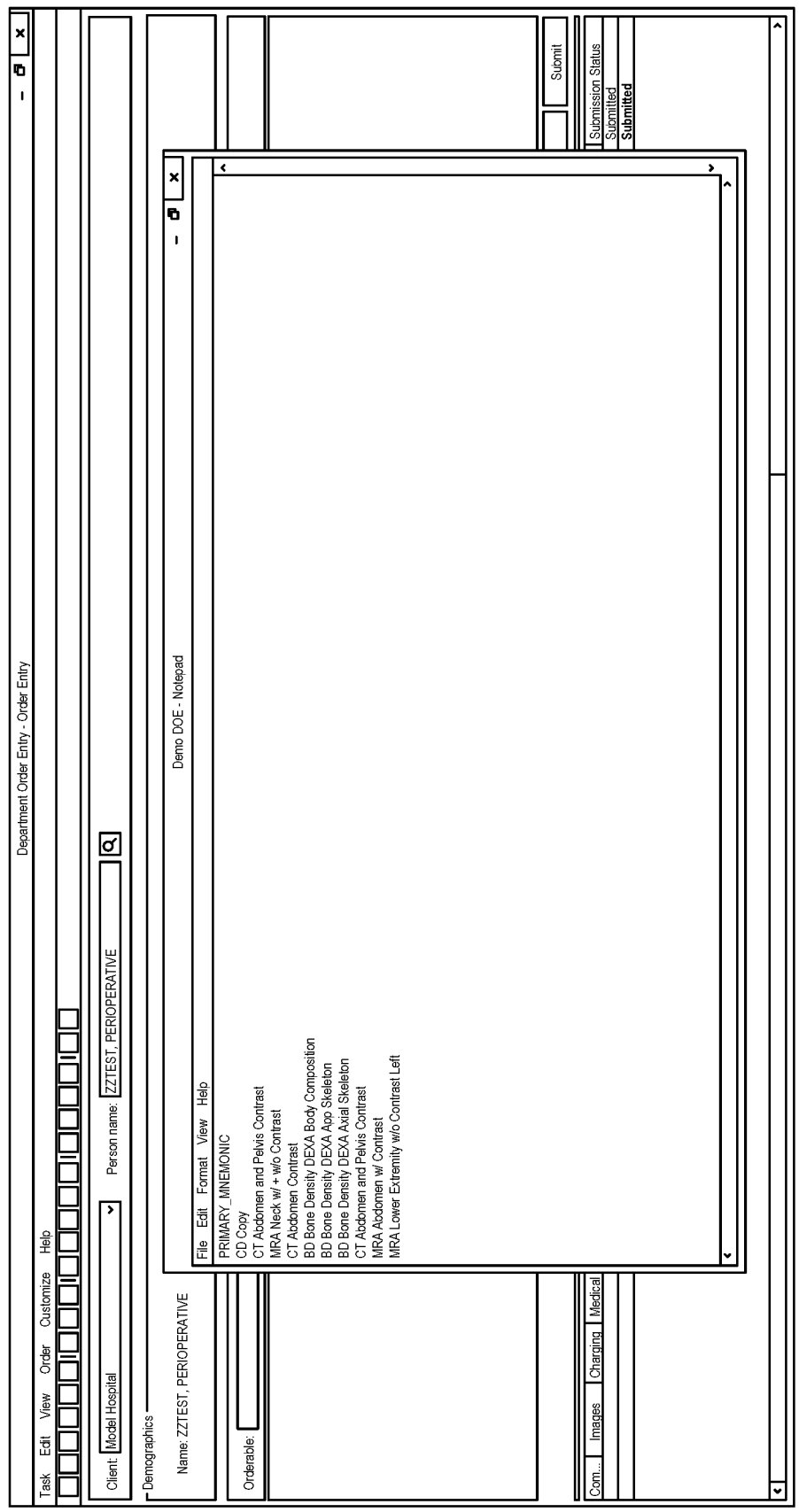
Figure 14:
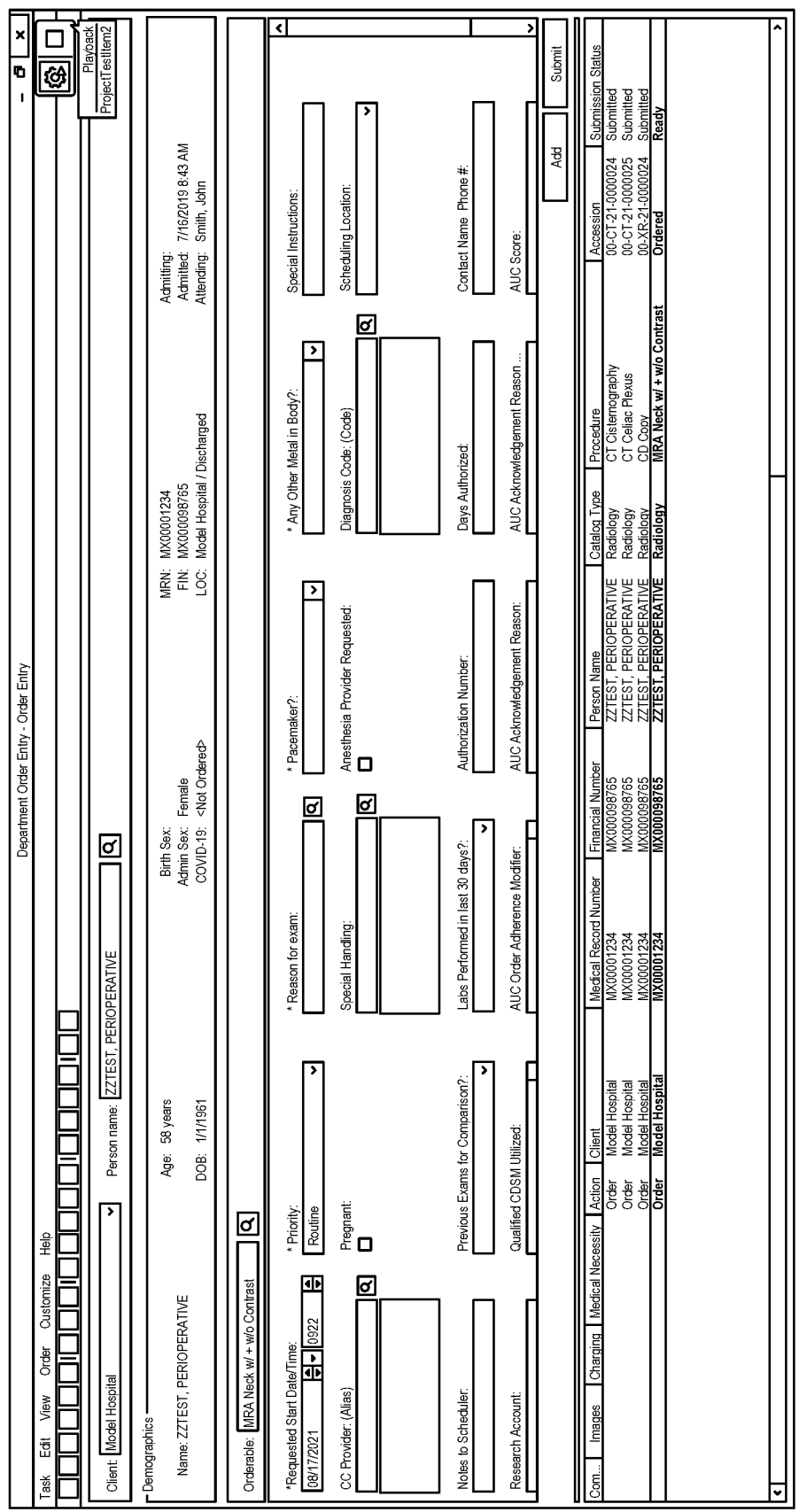
Figure 15:
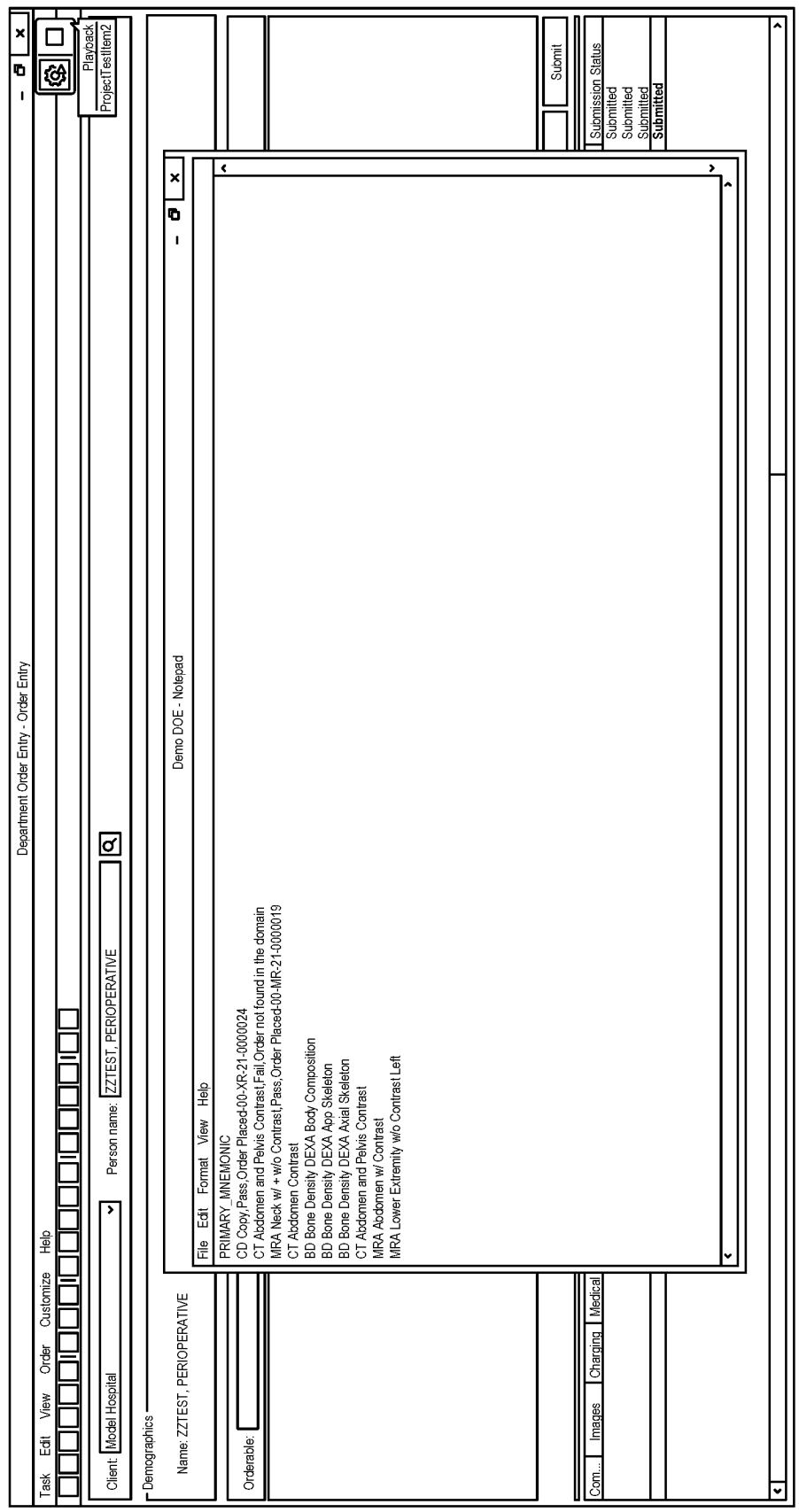
Figure 16:
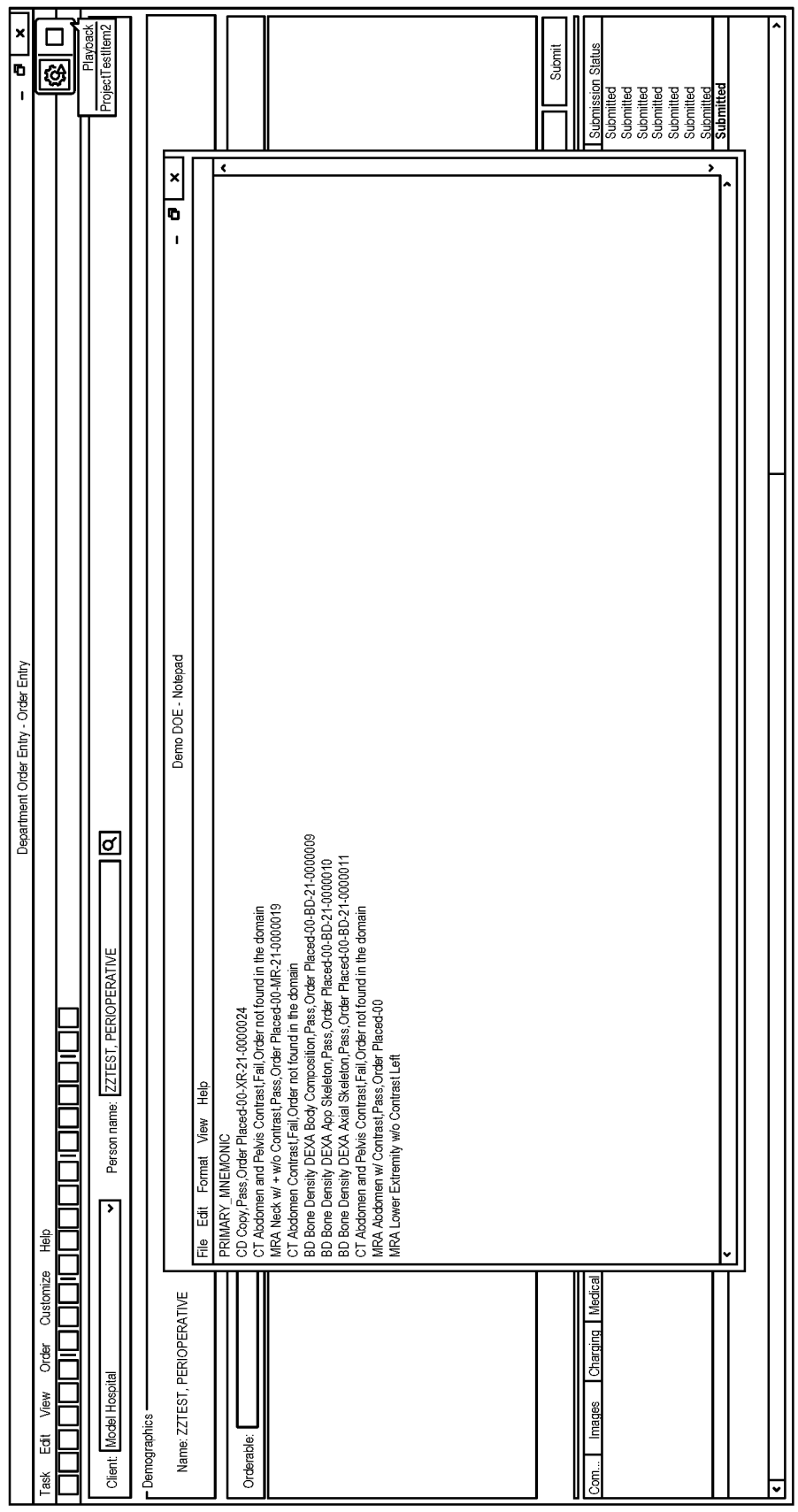
Figure 18:
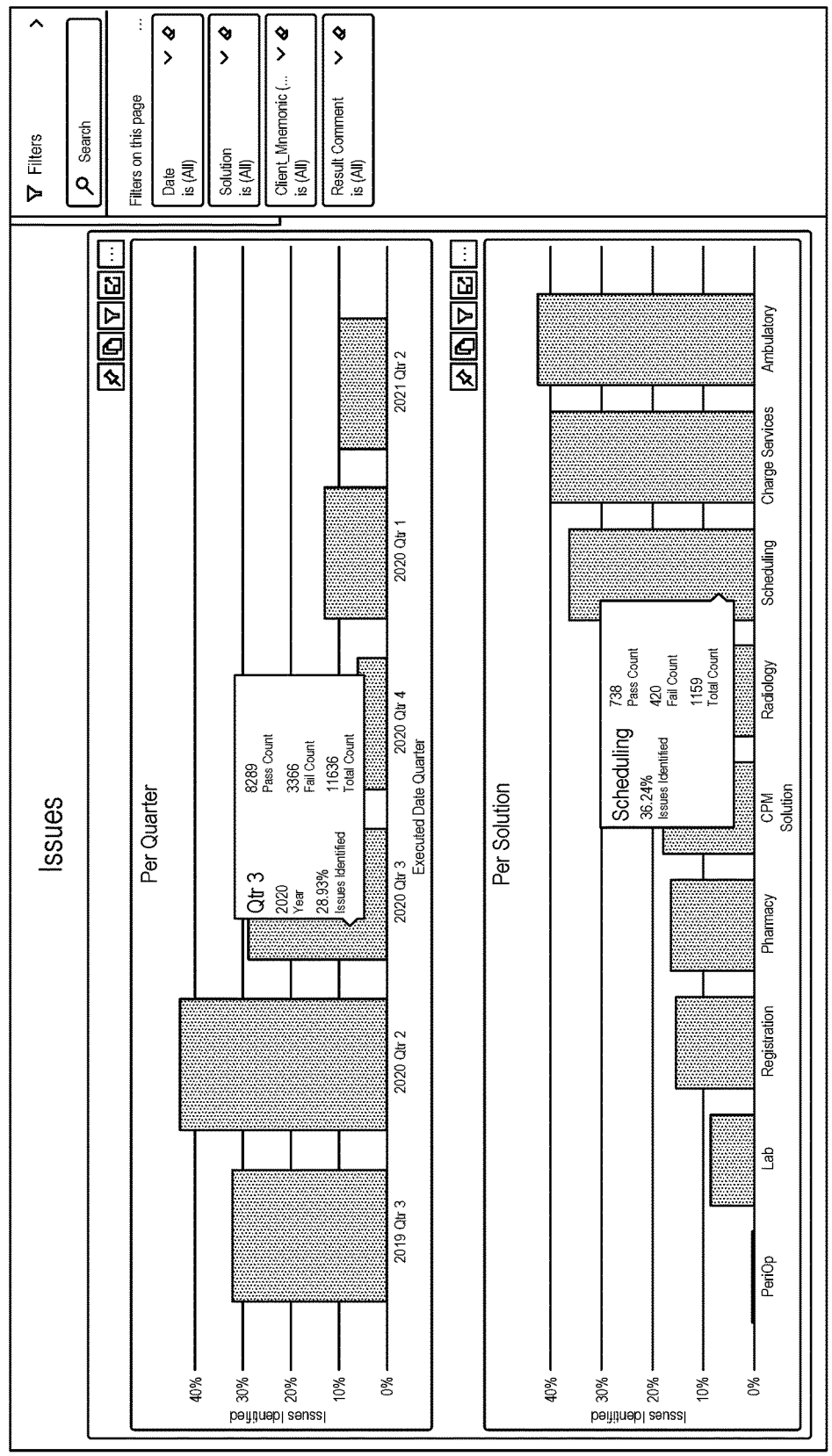

As an illustrative example, FIGS. 9-17 provide examples of graphical user interfaces of the testing application 102 in accordance with the system and method discussed. FIG. 9 depicts a graphical user interface 900 from which a particular use-modeling program can be selected and initiated for testing an end-user application. FIG. 10 depicts a graphical user interface 1000 that, in response to a use-modeling program being executed, can be optionally displayed. The graphical user interface 1000 corresponds to the end-user application being tested, with a pop-up shown of the reference data imported (e.g., previously displayed in another format in FIG. 8) that is being used by the use-modeling program. The first data line CD Copy is used by the use-modeling program to test the end-user application. For example, FIG. 11 depicts a graphical user interface 1100 of the end-user application where a step is being performed autonomously according to the use-modeling program being executed. In FIG. 11, the first data line CD Copy has been inserted into the field Orderable, and the use-modeling program continues with steps such as entering input to the field Routine into a Priority in the graphical user interface 1100 of the end-user application. Continuing to FIG. 12 depicts a graphical user interface 1200 wherein the use-modeling program continues with steps such as entering text characters as input values text into a field Reason for exam in the graphical user interface 1200 of the end-user application. As such, the use-modeling program works through a plurality of steps to mimic user interaction with the end-user application as means of testing. In this example, the use-modeling program continues testing of the end-user application by leveraging the next data line CT Abdomen and Pelvis Contrast (not shown). Further, in the graphical user interface 1300 of the end-user application shown in FIG. 13, the next sequential data line MRA Neck w/ +w/o Contrast is being autonomously typed in real-time into the field Orderable via the execution engine executing the use-modeling program. The use-modeling program continues with steps shown in the graphical user interface 1400 of the end-user application FIG. 14, wherein the entry of MRA Neck w/ +w/o Contrast into the field Orderable has caused the end-user application to auto-populate new fields configured for user input. In FIG. 14, the use-modeling program performs further steps specified in the script by entering values for variables obtained from the reference data, such as a date values of Aug. 17, 2021 and time values 0922 which are autonomously input into fields Requested Start Date/Time that are specifically configured for numerical characters, in this example. As such, the use-modeling program continues performing a plurality of steps and leveraging reference data. The testing application detects failures and successes of the steps performed, and automatically documents the failures and successes of the steps performed, for reference data. For example, a popup of the testing application is shown in FIG. 15 as overlaying the graphical user interface 1500 of the end-user application being tested. In the popup of FIG. 15, a testing application has automatically recorded results for the first data line CD Copy, as well as the results for subsequent data lines. FIG. 16 depicts an example of a popup of the testing application, wherein the testing application has automatically recorded successes and failures for steps performed in real-time by the use-modeling application, as testing the end-user application. Additionally or alternatively, detailed failure data can be stored in a repository in another format, as shown in FIG. 17. FIG. 18 depicts a graphical user interface 1800 that depicts an example summary of "passes"/successes and failures detected via the testing application 102, organized into a bar graph by quarter and by end-user application type, as an example. Hovering a cursor or points over specific bars can automatically cause a display of details for that bar, for example. As such, testing multiple end-user applications using hundreds of concurrent run instances and programs can be used to generate detailed and insightful data.

As a reminder, these figures provide insight for a single instance of testing the end-user application; however hundreds of other instances may be concurrently running. For the purposes of clarity and simplicity of discussion alone, these figures were discussed in a sequential manner.

Figure 19:
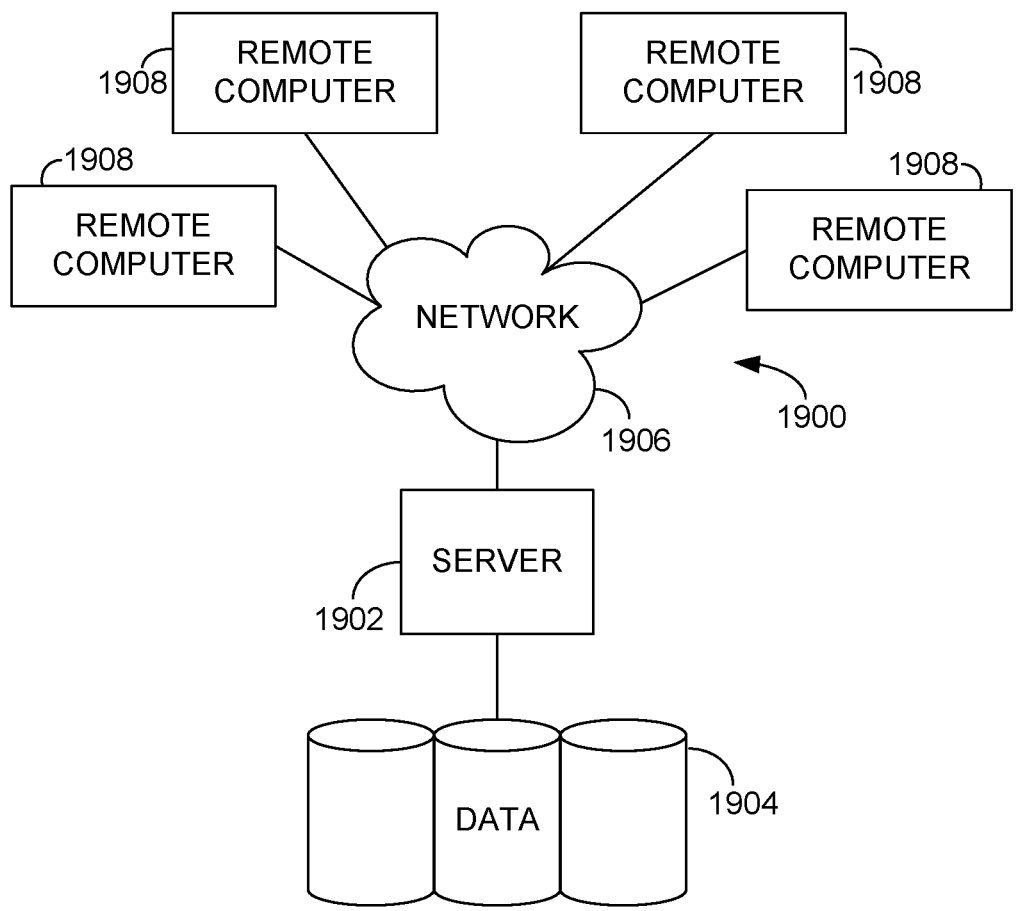
FIG. 19 is a block diagram of an example computing environment suitable to implement aspects of the present invention.

Turning to FIG. 19, an exemplary computing environment is depicted, in accordance with an embodiment of the present invention. It will be understood by those of ordinary skill in the art that the computing environment 1900 is just one example of a suitable computing environment and is not intended to limit the scope of use or functionality of the present invention. Similarly, the computing environment 1900 should not be interpreted as imputing any dependency and/or any requirements with regard to each component and combination(s) of components illustrated in FIG. 19. It will be appreciated by those having ordinary skill in the art that the connections illustrated in FIG. 19 are also exemplary as other methods, hardware, software, and devices for establishing a communications link between the components, devices, systems, and entities, as shown in FIG. 19, may be utilized in implementation of the present invention. Although the connections are depicted using one or more solid lines, it will be understood by those having ordinary skill in the art that the exemplary connections of FIG. 19 may be hardwired or wireless, and may use intermediary components that have been omitted or not included in FIG. 19 for simplicity's sake. As such, the absence of components from FIG. 19 should be not be interpreted as limiting the present invention to exclude additional components and combination(s) of components. Moreover, though devices and components are represented in FIG. 19 as singular devices and components, it will be appreciated that some embodiments may include a plurality of the devices and components such that FIG. 19 should not be considered as limiting the number of a device or component.

Continuing, the computing environment 1900 of FIG. 19 is illustrated as being a distributed environment where components and devices may be remote from one another and may perform separate tasks. The components and devices may communicate with one another and may be linked to each other using a network 1902. The network 1902 may include wireless and/or physical (e.g., hardwired) connections. Exemplary networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 1902, generally, provides the components and devices access to the Internet and web-based applications.

The computing environment 1900 comprises a computing device 1904 in the form of a computing device 1904. Although illustrated as one component in FIG. 19, the present invention may utilize a plurality of local servers and/or remote servers in the computing environment 1900. The computing device 1904 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The computing device 1904 may include or may have access to computer-readable media. Computer-readable media can be any available media that may be accessed by computing device 1904, and includes volatile and nonvolatile media, as well as removable and non-removable media. By way of example, and not limitation, computer-readable media may include computer storage media and communication media. Computer storage media may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 1904. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In embodiments, the computing device 1904 uses logical connections to communicate with one or more remote computers 1906 within the computing environment 1900. In embodiments where the network 1902 includes a wireless network, the computing device 1904 may employ a modem to establish communications with the Internet, the computing device 1904 may connect to the Internet using Wi-Fi or wireless access points, or the server may use a wireless network adapter to access the Internet. The computing device 1904 engages in two-way communication with any or all of the components and devices illustrated in FIG. 19, using the network 1902. Accordingly, the computing device 1904 may send data to and receive data from the remote computers 1906 over the network 1902.

Although illustrated as a single device, the remote computers 1906 may include multiple computing devices. In an embodiment having a distributed network, the remote computers 1906 may be located at one or more different geographic locations. In an embodiment where the remote computers 1906 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to trackable items in a clinical setting, for example.

In some embodiments, the remote computers 1906 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other embodiments, the remote computers 1906 may be physically located in a non-medical setting, such as a packing and shipping facility or deployed within a fleet of delivery or courier vehicles.

Continuing, the computing environment 1900 includes a data store 1908. Although shown as a single component, the data store 1908 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 1908 includes physical memory that is configured to store information encoded in data. For example, the data store 1908 may provide storage for computer-readable instructions, computer-executable instructions, data structures, data arrays, computer programs, applications, and other data that supports the functions and action to be undertaken using the computing environment 1900 and components shown in exemplary FIG. 19.

In a computing environment having distributed components that are communicatively coupled via the network 1902, program modules may be located in local and/or remote computer storage media including, for example only, memory storage devices. Embodiments of the present invention may be described in the context of computer-executable instructions, such as program modules, being executed by a computing device. Program modules may include, but are not limited to, routines, programs, objects, components, and data structures that perform particular tasks or implement particular abstract data types. In embodiments, the computing device 1904 may access, retrieve, communicate, receive, and update information stored in the data store 1908, including program modules. Accordingly, the computing device 1904 may execute, using a processor, computer instructions stored in the data store 1908 in order to perform embodiments described herein.

Although internal components of the devices in FIG. 19, such as the computing device 1904, are not illustrated, those of ordinary skill in the art will appreciate that internal components and their interconnection are present in the devices of FIG. 19. Accordingly, additional details concerning the internal construction device are not further disclosed herein.

Regarding FIGS. 1 through 19, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of a devices and/or components.

The present invention has been described in relation to particular embodiments, which are intended in all respects to be illustrative rather than restrictive. Further, the present invention is not limited to these embodiments, but variations and modifications may be made without departing from the scope of the present invention.

What is claimed is:

1. A system, comprising:
a repository;
a testing application; and
an execution engine comprising one or more processors and configured to cause initiation of a plurality of operations, the plurality of operations comprising:
importing, via the testing application, a use-modeling program that includes a script, the script configured to cause autonomous performance of a plurality of steps;
importing, via the testing application, a data collection workbook;
executing, via the execution engine, the use-modeling program, wherein the use-modelling program is configured to reference the data collection workbook to simulate a plurality of concurrent instances of an end-user application run in real-time, and wherein the plurality of concurrent instances are independently initiated at various steps in the plurality of steps;
detecting, via the testing application, one or more of a step failure, a data validation failure, a loading failure, or an operation failure of the end-user application for one or more of the plurality of concurrent instances based on executing the use-modeling program; and
storing, via the testing application, data documenting the one or more of the step failure, the data validation failure, the loading failure, or the operation failure in the repository.

2. The system of claim 1, wherein the plurality of steps comprises a plurality of simulated user interactions of the end-user application.

3. The system of claim 2, wherein executing the use-modeling program causes the script to autonomously perform, in real-time, the plurality of simulated user interactions in a predetermined sequence.

4. The system of claim 3, wherein the predetermined sequence of the plurality of simulated user interactions mimics a real-world sequence of operations performed by the end-user application in response to a real-world sequence of user interactions with a graphical user interface of the end-user application.

5. The system of claim 4, wherein the script is further configured to autonomously perform, in real-time, at least one of the plurality of simulated user interactions using a variable and a value predetermined for the variable from the data collection workbook.

6. The system of claim 5, wherein the data collection workbook includes a plurality of variables and a plurality of values that are specific to the end-user application.

7. The system of claim 6, wherein the script is further configured to autonomously input the value predetermined for the variable into the graphical user interface of the end-user application to trigger the operations performed by the end-user application as a test.

8. A method, comprising:
importing a use-modeling program that includes a script, the script configured to cause autonomous performance of a plurality of steps;
importing a data collection workbook;
executing the use-modeling program, wherein the use-modelling program references the data collection workbook to simulate a plurality of concurrent instances of an end-user application run in real-time, and wherein the plurality of concurrent instances are independently initiated at various steps in the plurality of steps;
detecting one or more of a step failure, a data validation failure, a loading failure, or an operation failure of the end-user application for one or more of the plurality of concurrent instances based on executing the use-modeling program; and
storing data documenting the one or more of the step failure, the data validation failure, the loading failure, or the operation failure in a repository.

9. The method of claim 8, wherein the plurality of steps comprise a plurality of simulated user interactions of an end-user application.

10. The method of claim 9, wherein executing the use-modeling program causes the script to autonomously perform, in real-time, each of the plurality of simulated user interactions in a predetermined sequence.

11. The method of claim 10, wherein the predetermined sequence of the plurality of simulated user interactions mimics a real-world sequence of operations performed by the end-user application in response to a real-world sequence of user interactions with a graphical user interface of the end-user application.

12. The method of claim 11, wherein the script autonomously performs, in real-time, at least one of the plurality of simulated user interactions using a variable and a value predetermined for the variable from the data collection workbook.

13. The method of claim 12, wherein the data collection workbook includes a plurality of variables and a plurality of values that are specific to the end-user application.

14. The method of claim 13, wherein the script autonomously inputs the value predetermined for the variable into the graphical user interface of the end-user application to trigger the operations performed by the end-user application as a test.

15. One more non-transitory media having computer-executable instructions embodied thereon that, when executed, cause initiation of multiple operations, the multiple operations comprising:
importing a use-modeling program that includes a script, the script configured to cause autonomous performance of a plurality of steps;
importing a collection workbook;
executing the use-modeling program, wherein the use-modelling program is configured to reference the data collection workbook to simulate a plurality of concurrent instances of an end-user application run in real-time, and wherein the plurality of concurrent instances are independently initiated at various steps in the plurality of steps;
detecting one or more of a step failure, a data validation failure, a loading failure, or an operation failure of the end-user application for one or more of the plurality of concurrent instances based on executing the use-modeling program; and
storing data documenting the one or more of the step failure, the data validation failure, the loading failure, or the operation failure in a repository.

16. The one or more non-transitory media of claim 15, wherein for each of the use-modeling program and at least one additional use modelling program: the plurality of corresponding steps comprise a plurality of simulated user interactions of an end-user application, and executing the use-modeling program causes the corresponding script to autonomously perform, in real-time, each of the plurality of simulated user interactions in a predetermined sequence.

17. The one or more non-transitory media of claim 16, wherein for each of the use-modeling programs: the corresponding script is configured to autonomously perform the plurality of simulated user interactions in the predetermined sequence, and the predetermined sequence of the plurality of simulated user interactions mimics a corresponding real-world sequence of operations performed by the end-user application in response to a real-world sequence of user interactions with a graphical user interface of the end-user application.

18. The one or more non-transitory media of claim 17, wherein for each of the use-modeling programs, the corresponding script is configured to autonomously perform at least one of the plurality of simulated user interactions using a variable and a value predetermined for the variable from the data collection workbook.

19. The one or more non-transitory media of claim 18, wherein each of the data collection workbook and an additional data collection workbook includes a plurality of variables and a plurality of values that are specific to corresponding end-user applications.

20. The one or more non-transitory media of claim 19, wherein the script is further configured to autonomously input the value predetermined for the variable into the graphical user interface of the end-user application to trigger the operations performed by the end-user application as a test.

* * * * *